United States Patent [19]

Franks et al.

[11] 4,247,431
[45] Jan. 27, 1981

[54] COMPOSITION AND PROCESS FOR MAKING PRECIPITATED NYLON

[75] Inventors: Neal E. Franks, Suffern, N.Y.; Julianna K. Varga, Asheville, N.C.

[73] Assignee: Akzona Incorporated, Asheville, N.C.

[21] Appl. No.: 54,358

[22] Filed: Jul. 2, 1979

Related U.S. Application Data

[63] Continuation-in-part of Ser. No. 938,907, Sep. 1, 1978, Pat. No. 4,196,282, which is a continuation-in-part of Ser. No. 854,957, Nov. 25, 1977, Pat. No. 4,145,532.

[51] Int. Cl.$^3$ .............................................. C08L 77/06
[52] U.S. Cl. ............................... 260/29.2 N; 528/335
[58] Field of Search ................. 260/29.2 N, 32.6 NA; 528/335, 326

[56] References Cited

U.S. PATENT DOCUMENTS

| | | | |
|---|---|---|---|
| 3,447,939 | 6/1969 | Johnson | 106/162 |
| 3,508,941 | 4/1970 | Johnson | 106/162 |
| 4,145,532 | 3/1979 | Franks | 106/176 |
| 4,171,293 | 10/1979 | Eschwey | 260/29.2 N |

*Primary Examiner*—Theodore E. Pertilla
*Attorney, Agent, or Firm*—Francis W. Young; Jack H. Hall; H. Walter Haeussler

[57] ABSTRACT

A composition and process are provided for making certain precipitated nylons by dissolving a nylon having an amide group index of less than 145, in a mixture of a tertiary amine oxide solvent and water. The nylon solutions of the invention contain from about 0.5% to about 11% water. Shaped articles can be formed from the solutions of the invention.

21 Claims, 5 Drawing Figures

COMPOSITION AND PROCESS FOR MAKING PRECIPITATED NYLON

CROSS REFERENCE TO RELATED APPLICATIONS

This application is a continuation-in-part of application Ser. No. 938,907 filed Sept. 1, 1978, now U.S. Pat. No.4,196,282 which in turn is a continuation-in-part of application Ser. No. 854,957, filed Nov. 25, 1977, now U.S. Pat. No. 4,145,532.

BACKGROUND OF THE INVENTION

A process for dissolving nylon or other materials having strong intermolecular hydrogen bonding in a tertiary amine oxide is disclosed by Johnson in U.S. Pat. No. 3,477,939. A cyclic mono(N-methylamine-N-oxide) compound such as N-methylmorpholine-N-oxide is used as the solvent. The solution can be used in chemical reactions involving the dissolved polymer or to precipitate the polymer to form a film or filament. The resulting solutions, insofar as the actual examples of the patent indicate, have significant disadvantages because they are of low solids content and have a high viscosity.

In accordance with the process disclosed in U.S. Pat. No. 3,508,941, two or more different polymers are dissolved in a cyclic mono(N-methylamine-N-oxide) compound and are precipitated together to produce a bicomponent polymer mixture. A diluent such as dimethyl sulfoxide, N-methylpyrrolidone or sulfolane may be added to the solution as a diluent to reduce its viscosity. The solutions also have the same deficiences noted for the first mentioned patent.

U.S. Pat. No. 4,145,532, and copending application Ser. No. 938,907 filed Sept. 1, 1978, now U.S. Pat. No. 4,196,282 to the inventors herein, discloses cellulose solutions and precipitated cellulose articles formed from a tertiary amine oxide solvent containing up to about 29% water.

It is noted that, when one attempts to dissolve a nylon in an anhydrous tertiary amine oxide, solution, if achievable, is only achieved at high temperatures usually with apparent decomposition of at least a portion of the amine oxide and/or nylon. The resultant mixture is generally very dark in color.

DESCRIPTION OF THE INVENTION

Figure 1:
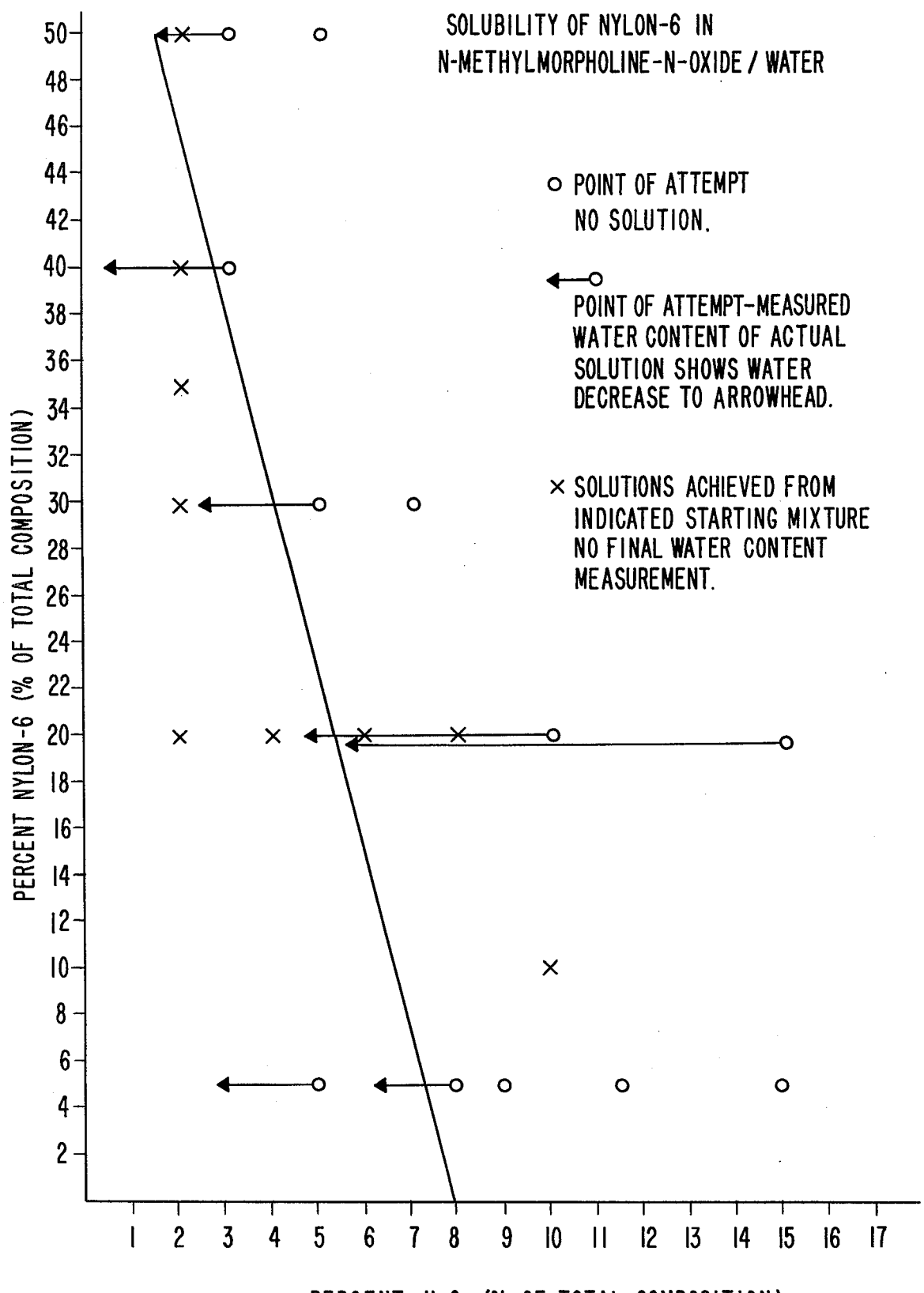
FIG. 1 is a graphic presentation of the solubility data of Example 1.

This invention relates to compositions and processes for forming solutions of nylons having an amide group index (molecular weight of repeating unit ÷ number of amide groups per repeating unit) of less than about 145, and preferably less than about 125, in a mixture of a tertiary amine oxide solvent and water. The nylon solutions of the invention contain a nylon solubility enhancing amount of water from about 0.5 to about 11% water based on the total weight of the solution. The maximum amount of water which can be employed in the solutions of the invention generally increases as the amide group index decreases. Also, the maximum amount of water which can be employed to form the solutions of the invention generally decreases as the amount of a given nylon present in the composition increases.

The nylon solutions of the invention can contain higher concentrations of nylon in a tertiary amine oxide than those solutions which have been available heretofore. Solutions containing up to about 50% by weight of nylon can be achieved. In addition, the solutions of the invention are formed at temperatures significantly lower than those required when employing anhydrous amine oxide, and the resultant solutions display less decomposition as compared to the anhydrous systems.

The nylon solutions of the invention are adapted for shaped article production such as by extrusion or spinning followed by coagulation in a non-solvent, for example water, to remove the solvent from the shaped films or filaments.

In the process of the invention a nylon is mixed with a solvent therefor containing a tertiary amine oxide in a specifically defined critical range of water to provide a solution of increased solids content.

The range of the amount of water present in the nylon solutions is a nylon solubility enhancing amount of water between about 0.5% to about 11%, preferably between about 1% to about 11% and most preferably between about 1.5% to about 11% by weight of water based upon the weight of the solutions.

The amine oxide employed in this invention must display certain essential characteristics. The amine oxide must be substantially stable at about 125° C., preferably 130° C., and most preferably 140° C. and must contain a N-methylamine oxide group endo or exo to an aromatic or a saturated or unsaturated ring i.e. corresponding to the formula

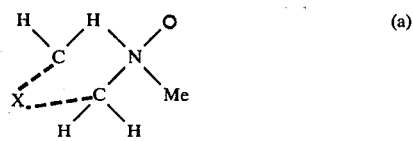

where X is a radical chain comprising 2 to 4 carbon atoms completing the ring; or

where Me is methyl, and Z is (i) an aromatic or saturated or unsaturated 5, 6 or 7 membered ring which is unsubstituted or substituted only by methyl at positions where the resulting ring width is less than about 5.15 Å or (ii) $CH_2CH_2W$ where W can be OH, SH or $NH_2$.

Tertiary amine oxides which may be used in practicing the invention include N-methylmorpholine N-oxide, and N,N-dimethylcyclohexylamine N-oxide.

It is noted that the amine oxides contemplated by the invention are sometimes referred as amine oxides. They are more properly termed "tertiary amine N-oxides".

The nylons which can be employed in this invention include any fiber forming nylon, having an amide group index of less than about 145. If desired, mixtures of suitable nylon polymers can be employed. The presently preferred nylons include nylon 4, nylon 6, nylon 6,6 and nylon 6,T (polyhexamethylene terephthalamide). Nylons 6,9 and 6,10 can also be dissolved. The inventors have found that nylons such as nylon 6,12 and nylon 11 present significant difficulties when solutions are attempted.

There follow examples of the invention which are considered illustrative rather than limiting. All parts and percentages are by weight unless otherwise specified. All temperatures are in degrees Centigrade. Relative viscosities of nylon 6 and nylon 6,T were determined at 25° C. in a Ubbelohde viscosimeter as 1.0% solutions in 90% formic acid and concentrated sulfuric acid, respectively. Water determinations in the examples were made using a C-Aqua-tester, (Cat. No. 04–10–000, C.W. Brabender Instruments Co., S. Hackensack, N.J.

sealable top. The open test tube was then placed in a glycerine bath and heated to about 140°–160° C. The mixture was stirred as it was heated. Samples were taken and the state of the polymer observed under a microscope. The results are summarized in Table 1A. Samples for relative viscosity were prepared by water precipitation of the solutions, washing the precipitated polymer substantially free of amine oxide and drying the polymer.

TABLE 1A

SOLUBILITY OF NYLON-6 IN NMMO/WATER

| Initial Composition | | | % Water | Trial Conditions | | Observations |
|---|---|---|---|---|---|---|
| % polymer | % NMMO | % H₂O | Final Solution | Temperature °C. | Time Minutes | |
| 5 | 80 | 5 | — | 150–160 | 60 | decomposed |
| 5 | 83.5 | 11.5 | — | 150–160 | 30 | decomposed |
| 5 | 86 | 9 | — | 150–160 | 30 | decomposed |
| 5 | 90 | 5 | 2.8 | 145 | — | color: slightly dark |
| 5 | 87 | 8 | 6.2 | 147 | — | color: slightly dark |
| 60 | 40 | 0 | — | 150–160 | — | decomposed |
| 20 | 80 | 0 | — | 150–160 | — | decomposed |
| 15 | 85 | 0 | — | 150–160 | — | decomposed |
| 10 | 90 | 0 | — | 150–160 | — | decomposed |
| 5 | 95 | 0 | — | 150–160 | — | decomposed |
| 50 | 47 | 3 | 1.6 | 145 | — | color: very dark |
| 55 | 30 | 15 | — | 150–160 | — | decomposed |
| 55 | 35 | 10 | — | 150–160 | — | decomposed |
| 55 | 40 | 5 | — | 150–160 | — | decomposed |
| 50 | 45 | 5 | — | 150–160 | — | decomposed |
| 40 | 57 | 3 | 0.4 | 147 | — | color: dark |
| 40 | 53 | 7 | — | 150–160 | — | color: dark |
| 30 | 65 | 5 | 2.5 | 140 | — | color: slightly dark |
| 30 | 63 | 7 | — | 150–160 | — | color: slightly dark |
| 20 | 70 | 10 | 4.8 | 142 | — | color: dark |
| 20 | 65 | 15 | 5.6 | 142–143 | — | color: dark |

Trial B

The amine oxide and water were placed in a weighing dish and heated in a glycerine bath to a liquid state at which time the nylon 6 was added and rapidly stirred. The bath temperature was 150°–160° C. The results are summarized in Table 1B.

TABLE 1B

SOLUBILITY OF NYLON 6 IN NMMO

| Solution Starting Solvent Mixture | Bath Temp. | Remelting Temp. | Dissolved | % H₂O In final Sol'n. | Relative Viscosity* | Sol'n. Color |
|---|---|---|---|---|---|---|
| 0% H₂O - 20% N-6 | 180–190° C. | 160–165° C. | Yes | — | 2.47 | Dark |
| 2% H₂O - 20% N-6 | 180° C. | 150–155° C. | Yes | 2.1 | 2.52 | Med. dark |
| 4% H₂O - 20% N-6 | 160° C. | 140–145° C. | Yes | 3.8 | 2.39 | Light |
| 6% H₂O - 20% N-6 | 150° C. | 135° C. | Yes | 5.9 | 2.27 | Light |
| 8% H₂O - 20% N-6 | 145° C. | 125° C. | Yes | 7.8 | 2.08 | Light |
| 2% H₂O - 30% N-6 | 170° C. | 140–145° C. | Yes | 1.8 | 2.62 | Light |
| 2% H₂O - 35% N-6 | 160–170° C. | 145–150° C. | Yes | 1.2 | 2.56 | Light |
| 2% H₂O - 40% N-6 | 160–170° C. | 145–150° C. | Yes | 0.2 | 2.58 | Light |
| 2% H₂O - 50% N-6 | 170° C. | 160° C. | Yes | 0.2 | 2.61 | Light |

The 20% solutions have medium-high viscosity. The solutions containing 30–50% nylon had excellent stretchability while the 50% solution was highly viscous. All the solutions were formed during a short (5–8 min.) dissolving period.
*of nylon-6 recovered from solution.

EXAMPLE 1

Solubility trials were conducted employing dried, ground, bright, undelustered nylon 6 chips with a relative viscosity of 2.45, N-methylmorpholine N-oxide and water.

Trial A

Solutions were attempted at various concentrations of polymer, amine oxide and water. The materials were weighed into a flat bottom test tube, with a ground glass The solubility trials are graphically set forth in FIG. 1. The above trials were conducted in open containers. It is noted that amine oxides are hygroscopic and thus tend to pick up water from the air at normal or up to a certain temperature, above which, when in admixture with water, they tend to release water vapor. The solution procedure and the water measurement procedure thus have some bearing on the amount of water initially employed and subsequently measured.

Some of the solutions in Table 1A showed at least some decomposition even though water was included in the solvent. Other factors appear to be important in achieving light-colored solutions namely, (1) dissolution and residence time, (2) the purity of amine oxide, and (3) the nylon particle size (surface area).

Figure 2:
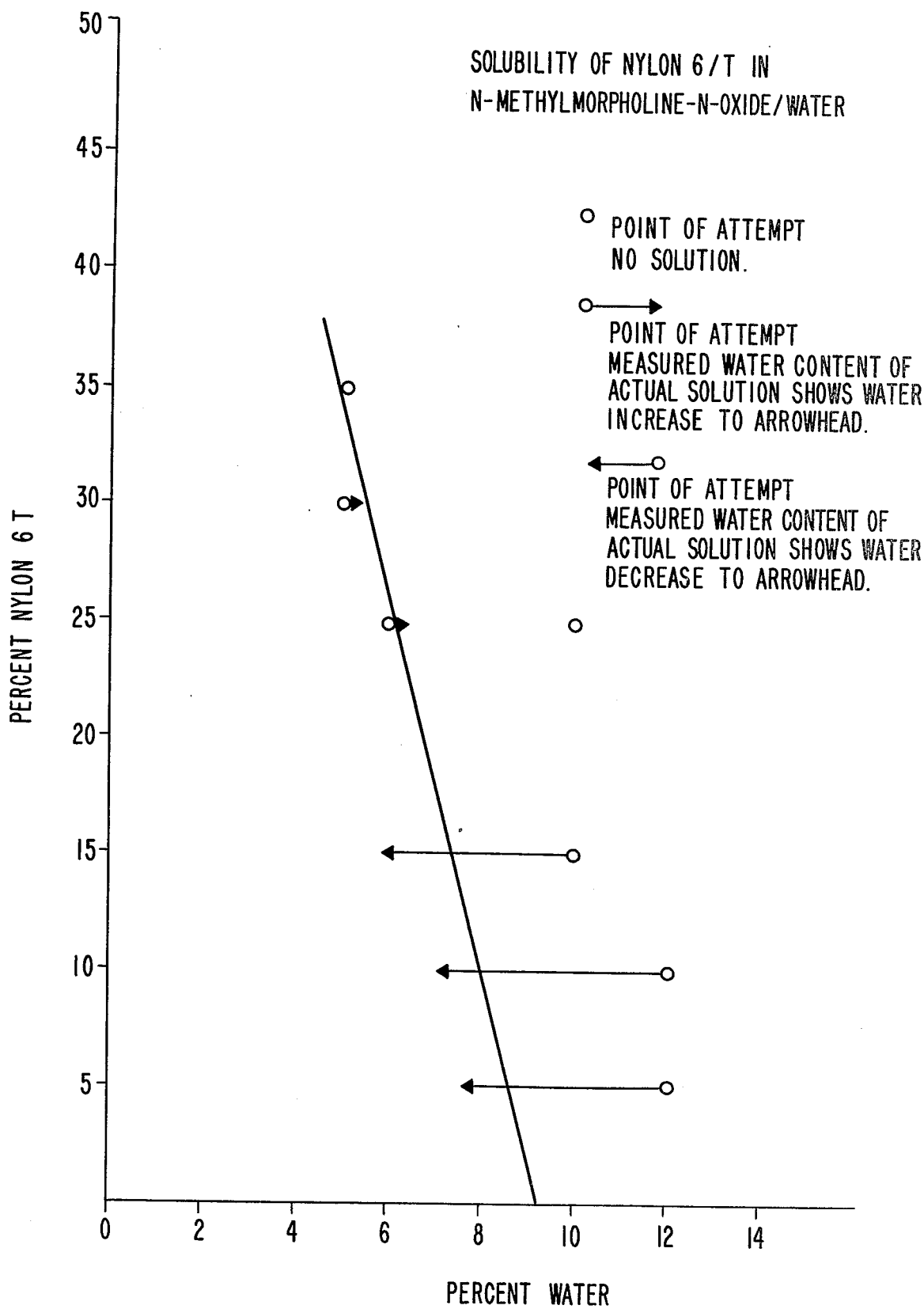
FIG. 2 is a graphic presentation of the solubility data of Example 2.

To some extent the dissolution time is dependent on the mixing equipment, the size of the mixing operation and the surface area of the nylon being dissolved.

collected (Table 2) and are graphically represented in FIG. 2.

A glass container was suspended in a glycol bath on a stirrer hotplate. All mixture components were combined and mixed in the glass container. The mixtures were stirred with a spatala during heating. The mixes contained 25 g. total weight.

TABLE 2
SOLUBILITY OF NYLON 6,T IN NMMO

| Solution No. | Initial Mix Concentration (%) | | | Water Concentration (%) After Solution | Comments |
|---|---|---|---|---|---|
| | NMMO | Water | Polymer | | |
| 1 | 89.4 | 5.3 | 5.3 | 8.8 | Heated from room temperature (RT) to 145° C. |
| 2 | 95 | 0 | 5 | Decomposed (No Analysis) | Heated from RT to 185° C.; Decomposed |
| 3 | 85 | 0 | 15 | Decomposed (No Analysis) | Heated from RT to 185° C. (Violent Reaction) |
| 4 | 75 | 10 | 15 | 6.9 | Heated from RT to 145° C., solution time 1.25 hours; color dark brown |
| 5 | 83 | 12 | 5 | 7.4 | Heated from RT to 145° C. |
| 6 | 65 | 10 | 25 | No analysis made | Heated from RT to 145° C.; No sol'n. achieved |
| 7 | 69.3 | 5.9 | 24.8 | 5.6 | Heated from RT to 145° C.; Time: 65 Minutes; Good stretchability |
| 8 | 87 | 3 | 10 | 4.4 | Heated from RT to 145° C. |
| 9 | 65 | 5 | 30 | 5.5 | Heated from RT to 145° C.; Time: 2 Hours Good color and stretchability |
| 10 | 78 | 12 | 10 | 7.2 | Heated from RT to 145° C.; Time: 1.5 Hours |
| 11 | 60 | 5 | 35 | 4.4 | Heated from RT to 145° C.; Time: 2 Hours; Good stretchability |
| 12 | 69 | 9 | 22 | 5.5 | Heated from RT to 145° C.; Time: 1.5 Hours |
| 13 | 63 | 2 | 35 | 4.2 | Heated from RT to 145-150° C. for ~1.5 hours - Few undissolved chips remain. Temperature increased to 155° C. complete solution within ~10 minute additional heating time. Decomposition was accelerated, but no violent reaction occurred. Solution stretchability good, color medium brown |

EXAMPLE 2

Using the following solubility trial procedure solubility data for nylon 6,T (polyhexamethylene terephthalamide), having a relative viscosity of 2.41 (measured as a 1% solution in concentrated $H_2SO_4$ at 25° C.), were

EXAMPLE 3

Figure 3:
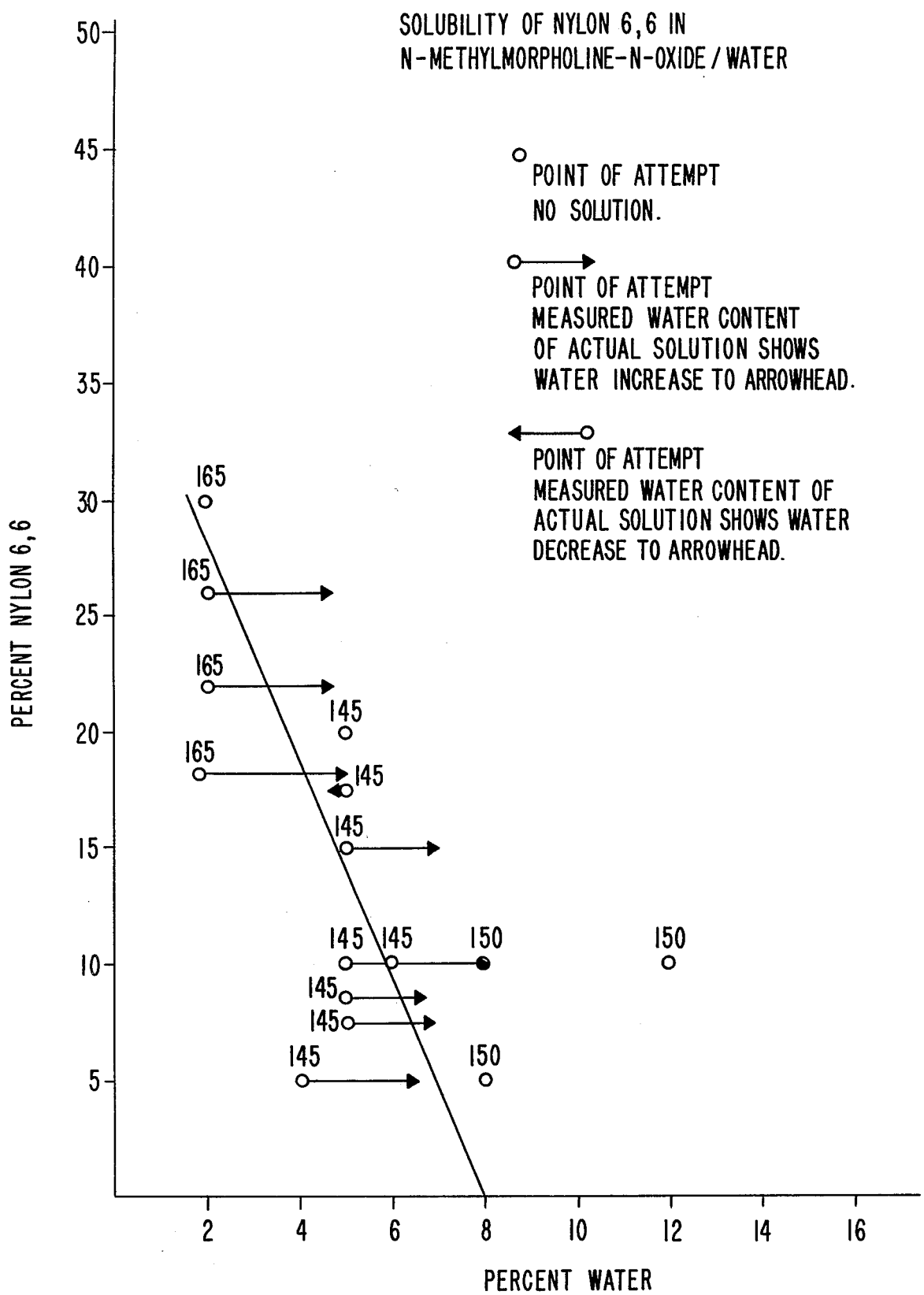
FIG. 3 is a graphic presentation of the solubility data of Example 3.

Using the solubility trial procedure of Example 2 solubility data for nylon 6,6 were collected (Table 3) and are graphically represented in FIG. 3. The numbers above the data points in FIG. 3 indicate the temperature of the solution trial.

TABLE 3
SOLUBILITY OF NYLON 6,6 IN NMMO

| Solution No. | Initial Mix Concentration (%) | | | Water Concentration (%) After Solution | Comments |
|---|---|---|---|---|---|
| | NMMO | Water | Polymer | | |
| 1 | 78 | 12 | 10 | No analysis made | Temperature 140-150° C.; Time: 3 Hours; No sol'n., decomposed |
| 2 | 82 | 8 | 10 | No analysis made | Temperature 140-150° C.; Time: 3 Hours; No sol'n., decomposed |
| 3 | 87 | 8 | 5 | No analysis made | Temperature 140-150° C.; Time: 3 Hours; No sol'n., decomposed |
| 4 | 91 | 4 | 5 | 6.4 | Temperature 145° C.; Time: 20 Minutes; Solution |
| 5 | 84 | 6 | 10 | No analysis made | Temperature 145° C.; Time: 3 Hours No sol'n., decomposed |
| 6 | 84 | 6 | 10 | No analysis made | Temperature 145° C.; Time: 3 Hours No sol'n., decomposed |
| 7 | 87.5 | 5 | 7.5 | 6.8 | Temperature 145° C.; Time: 25 Minutes; Solution |
| 8 | 86.5 | 5 | 8.5 | 6.6 | Temperature 145° C.; Time: 30 Minutes; Solution |
| 9 | 85 | 5 | 10 | 8.0 | Temperature 145° C.; Time: 1 Hour; Solution; Poor solution stretchability |
| 10 | 80 | 5 | 15 | 6.8 | Temperature 145° C.; Time: 1 Hour; Solution |
| 11 | 75 | 5 | 20 | No analysis made | Temperature 145° C.; Time: 2.5 Hours; No solution, decomposed |
| 12 | 77.5 | 5 | 17.5 | 4.8 | Temperature 145° C.; Time: 1.5 Hours; Solution Poor Stretchability |
| 13 | 75 | 5 | 20 | No analysis made (Recheck of 11) | Temperature 145° C.; Time: 2 Hours; No solution, decomposed |
| 14 | 80.0 | 1.8 | 18.2 | 5.0 | Temperature 165° C.; Time: 25 Minutes; Solution, NMMO decomposition increased |
| 15 | 76 | 2 | 22 | 4.6 | Temperature 165° C.; Time: 30 Minutes; Solution, Color: dark brown |
| 16 | 68 | 2 | 30 | 2.6 | Temperature 165° C.; Time: 40 Minutes; No solution, decomposed, gels present |
| 17 | 72 | 2 | 26 | 4.6 | Temperature 165° C.; Time: 30 Minutes; |

TABLE 3-continued

| | SOLUBILITY OF NYLON 6,6 IN NMMO | | | | |
|---|---|---|---|---|---|
| | Initial Mix Concentration (%) | | | Water Concentration (%) | |
| Solution No. | NMMO | Water | Polymer | After Solution Solution | Comments |

EXAMPLE 4

A 15% nylon solution was made by dissolving 5.3 parts of ground bright, undelustered nylon 6 chips in 30 parts of N,N-dimethylcyclohexylamine N-oxide (DMCHA-O) containing 11.9% water by heating and stirring at 120°–125° C. for 20 minutes.

EXAMPLE 5

Solubility trials were conducted with nylon 4, N-methylmorpholine N-oxide and water. The amine oxide was weighed into a glass dish and water added to the desired concentration. The dish was placed in a glycol bath at 155°–160° C. until the mixture became a clear liquid. At this point, the finely ground polymer was added and allowed to soak for 5–10 minutes. Stirring was then intermittent until either a solution was achieved, or decomposition terminated the trial.

At solution point, a slide was prepared and the dish was removed from the bath. The solution was then transferred to a Teflon plate and placed inside a plastic bag or placed on a plastic bag and pressed, then put in a plastic cup with a lid.

Figure 4:
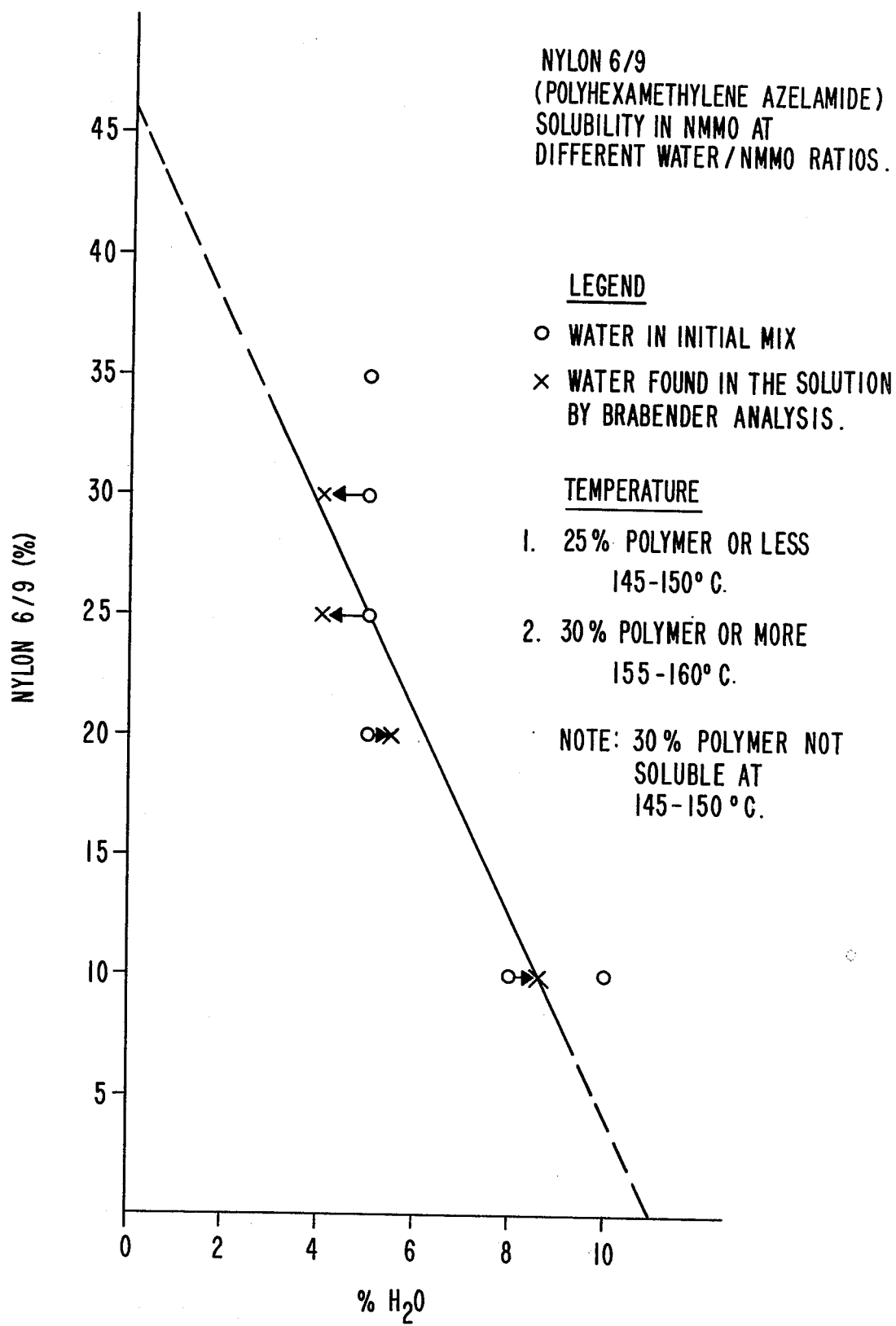
FIG. 4 is a graphic presentation of the solubility data of Example 5.

The results are summarized in Table 4 and are presented graphically in FIG. 4.

TABLE 4

| SOLUBILITY OF NYLON 4 IN NMMO-WATER | | | | |
|---|---|---|---|---|
| Initial Mixture % | | | % H$_2$O Measured | |
| Polymer | NMMO | Water | In Final Sol'n. | Observations |
| 10 | 80 | 10 | 5.4 | Light colored viscous sol'n. after heating at 155–160° C. for 25 min. |
| 10 | 75 | 15 | 7.5 | Light colored sol'n. after 38 min. at 155–160° C. |
| 10 | 70 | 20 | 5.4 | Chips did not dissolve until water content was reduced by evaporation |
| 25 | 70 | 5 | 6.2 | Extreme viscosity, solution questionable |
| 20 | 70 | 10 | 5.7 | After 45 minutes at 155–160° C. light colored solution |
| 20 | 65 | 15 | 8.2 | Highly viscous sol'n. after 16 min. at 155–160° C. |
| 15 | 75 | 10 | 6.6 | Viscous light colored sol'n. after heating to 155–160° C. |
| 15 | 65 | 20 | 6.0 | No sol'n. until H$_2$O evaporation, then light colored sol'n. |
| 5 | 85 | 10 | 8.1 | 25–30 min. at 155–160° C. medium viscosity-amber to brown sol'ns. |
| 5 | 80 | 15 | 8.8 | |
| 5 | 75 | 20 | 10.2 | |
| 20 | 60 | 20 | 7.5 | Highly viscous solution after 16 min. at 155–160° C. |

EXAMPLE 6

Figure 5:
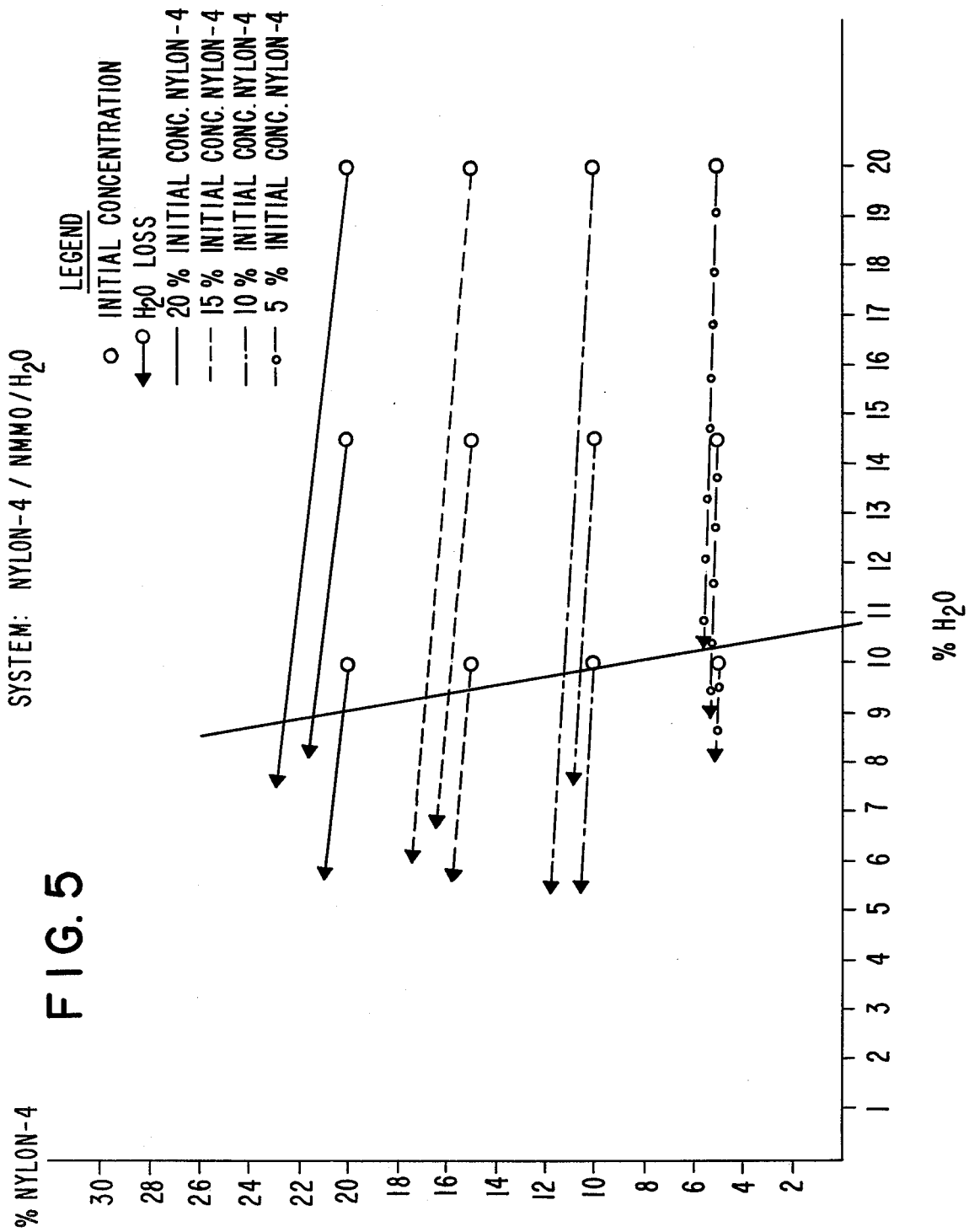
FIG. 5 is a graphic presentation of the solubility data of Example 6.

Following the procedure of Example 2, solubility data for nylon 6,9 in N-methylmorpholine N-oxide-water were collected and are summarized in Table 5 and are graphically presented in FIG. 5.

TABLE 5

| SOLUBILITY OF NYLON 6,9 IN NMMO/WATER | | | | |
|---|---|---|---|---|
| Initial Mixture % | | | Water Measured | |
| NMMO | Water | Polymer | In Final Sol'n. | Observations |
| 80 | 10 | 10 | | 140–150° C. for 1.5 hr.; no sol'n. |
| 82 | 8 | 10 | 8.6 | 140–150° C. for 45 min.; dark sol'n. |
| 75 | 5 | 20 | 5.4 | 145° C. for 45 min.; dark sol'n. |
| 65 | 5 | 30 | | 145–150° C. for 90 min.; no sol'n. |
| 70 | 5 | 25 | 4.0 | 155–160° C. for 45 min.; dark sol'n.; some stretchability |
| 65 | 5 | 30 | | 155–160° C. for 60 min.; sol'n. not quite complete |
| 65 | 5 | 30 | 4.0 | 155–160° C. for 65 min.; |

TABLE 5-continued

SOLUBILITY OF NYLON 6,9 IN NMMO/WATER

| Initial Mixture % | | | Water Measured | |
|---|---|---|---|---|
| NMMO | Water | Polymer | In Final Sol'n. | Observations |
| 60 | 5 | 35 | | dark sol'n; good stretchability 155-160° C. for 60 min. incomplete sol'n.; some decomposition |

EXAMPLE 7

Following the procedure of Example 2, solubility data for nylon 6,10 in N-methylmorpholine N-oxide-water were collected and are summarized in Table 6.

TABLE 6

SOLUBILITY OF NYLON 6,10 IN NMMO-WATER

| | Initial Mixture % | | | % Water Measured | |
|---|---|---|---|---|---|
| Run # | NMMO | Water | Polymer | in Final Sol'n. | Times, Temperatures, Observations |
| 1 | 82 | 8 | 10 | No solution | 145° C., 80 minutes, decomposed |
| 2 | 85 | 5 | 10 | 6.0 | 145° C., 105 minutes, very dark sol'n. |
| 3 | 85 | 5 | 10 | 4.8 | 145-150° C., 90 minutes, very dark sol'n. |
| 4 | 80 | 5 | 15 | 4.9 | 155-160° C., 45 minutes, brown sol'n. |
| 5 | 75 | 5 | 20 | 3.8 | 170° C., 25-30 minutes, light brown sol'n. |
| 6 | 65 | 5 | 30 | 5.0 | 170° C., 25-30 minutes, light brown sol'n.; good elongation |
| 7 | 60 | 5 | 35 | 4.6 | 170° C., 40 minutes, light brown sol'n., very good elongation |
| 8 | 55 | 5 | 40 | 4.4 | 170° C., 60 minutes, incomplete sol'n. most chips dissolved, but marked decomposition after 60 minutes - black color |

As can be seen from all of the above data, a maximum amount of about 50% by weight of nylon can be dissolved by the process of the invention. Depending on the type of nylon and the amine oxide, in certain instances, an amount less than 50% by weight is the maximum amount of nylon which can be dissolved. In any event, substantial amounts of fiber forming nylon, for example, for 1% up to 25, 30 or 35% typically readily dissolve to form useful solutions.

Further, while not exemplified, if desired, mixtures of nylons can be dissolved and/or mixtures of amine oxides can be employed.

If desired, a non-reactive organic co-solvent may be used in quantities up to, for example, about 25% by weight of the total solution, as a less expensive diluent for the amine oxide, or to lower the viscosity of the solution.

As used herein, "substantial stability" means sufficient stability to provide useful shaped polymer article forming solutions.

While the invention is described in detail above, it is understood that variation can be made by those skilled in the art without departing from the scope of the invention.

What is claimed is:

1. A solution comprising
   (a) a nylon having an amide group index of less than about 145,
   (b) a tertiary amine oxide nylon solvent which has a N-methylamine oxide group endo or exo to an aromatic or saturated or unsaturated ring and which has substantial stability at 125°, and
   (c) a nylon solubility enhancing amount of water between about 1.5 to about 11% by weight based upon the weight of the solution.

2. The solution, as in claim 1, where the nylon is nylon 4, nylon 6, nylon 6,6 or nylon 6,T.

3. The solution, as in claim 2, where the nylon is nylon 4.

4. The solution, as in claim 2, where the nylon is nylon 6 or 6,6.

5. The solution, as in claim 2, where the nylon is nylon 6,T.

6. The solution, as in claims 1, 2, 3, 4 or 5 where the amine oxide is N-methylmorpholine N-oxide.

7. The solution, as in claim 1, where the nylon has an amide group index of less than about 125.

8. The solution, as in claims 1, 2 or 7 where the nylon has an amide group index of less than about 125 and the amine oxide has substantial stability at 140° C.

9. The solution, as in claims 1, 2 or 7 which contains at least about 1% nylon.

10. The solution, as in claim 9, which contains at least about 5% nylon.

11. In a process for precipitating a nylon from a solution thereof which comprises dissolving the nylon in a solvent for the nylon containing a tertiary amine oxide and thereafter shaping the solution and separating the nylon from the tertiary amine oxide, the improvement wherein the solution is prepared by dissolving at least about 1% by weight of a nylon having an amine group index of less than about 145 in a tertiary oxide nylon solvent which has substantial stability at 125° C., in admixture with a nylon solubility enhancing amount of water.

12. The process, as in claim 11, where the nylon is nylon 4, nylon 6, nylon 6,6 or nylon 6,T.

13. The process, as in claim 12, where the nylon is nylon 4.

14. The process, as in claim 12, where the nylon is nylon 6 or 6,6.

15. The process, as in claim 12, where the nylon is nylon 6,T.

16. The process, as in claims 11, 12, 13, 14, or 15 where the amine oxide is N-methylmorpholine N-oxide.

17. The process, as in claim 11, where the nylon has a amide group index of less than about 125.

18. The process, as in claims 11, 12 or 17 where the nylon has an amide group index of less than about 125 and the amine oxide has substantial stability at 140° C.

19. The process, as in claims 11, 12, or 17, wherein the solubility enhancing amount of water is an amount between about 0.5 to about 11% based on the weight of the solution.

20. The process, as in claim 18, which contains at least about 5% nylon.

21. The process, as in claim 19, which contains at least about 5% nylon.

* * * * *